United States Patent
Kim et al.

(10) Patent No.: US 10,373,323 B1
(45) Date of Patent: Aug. 6, 2019

(54) METHOD AND DEVICE FOR MERGING OBJECT DETECTION INFORMATION DETECTED BY EACH OF OBJECT DETECTORS CORRESPONDING TO EACH CAMERA NEARBY FOR THE PURPOSE OF COLLABORATIVE DRIVING BY USING V2X-ENABLED APPLICATIONS, SENSOR FUSION VIA MULTIPLE VEHICLES

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, Inc., Gyeongbuk (KR)

( * ) Notice: Subject to any disclaimer, the term of this patent is extended or adjusted under 35 U.S.C. 154(b) by 0 days.

(21) Appl. No.: 16/260,244

(22) Filed: Jan. 29, 2019

(51) Int. Cl.
*G06K 9/00* (2006.01)
*G06T 7/32* (2017.01)
(Continued)

(52) U.S. Cl.
CPC .................. *G06T 7/32* (2017.01); *B60R 1/00* (2013.01); *G05D 1/0246* (2013.01);
(Continued)

(58) Field of Classification Search
CPC ............ G06T 7/32; G06T 2207/30261; G06T 2207/20221; G05D 1/0246; G05D 1/0276;
(Continued)

(56) References Cited

U.S. PATENT DOCUMENTS 10,007,865 B1 * 6/2018 Kim ..................... G06K 9/6231
10,169,679 B1 * 1/2019 Kim ..................... G06K 9/6256
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — FisherBroyles, LLP; Susan M. Oiler (57) ABSTRACT

A method for merging object detection information detected by object detectors, each of which corresponds to each of cameras located nearby, by using V2X-based auto labeling and evaluation, wherein the object detectors detect objects in each of images generated from each of the cameras by image analysis based on deep learning is provided. The method includes steps of: if first to n-th object detection information are respectively acquired from a first to an n-th object detectors in a descending order of degrees of detection reliabilities, a merging device generating (k-1)-th object merging information by merging (k-2)-th objects and k-th objects through matching operations, and re-projecting the (k-1)-th object merging information onto an image, by increasing k from 3 to n. The method can be used for a collaborative driving or an HD map update through V2X-enabled applications, sensor fusion via multiple vehicles, and the like.

22 Claims, 4 Drawing Sheets

(51) Int. Cl.
*H04W 4/40* (2018.01)
*B60R 1/00* (2006.01)
*G05D 1/02* (2006.01)

(52) U.S. Cl.
CPC ....... *G05D 1/0276* (2013.01); *G06K 9/00805* (2013.01); *H04W 4/40* (2018.02); *B60R 2300/303* (2013.01); *G05D 2201/0213* (2013.01); *G06T 2207/20221* (2013.01); *G06T 2207/30261* (2013.01)

(58) Field of Classification Search
CPC ............ G05D 2201/0213; H04W 4/40; G06K 9/00805; B60R 2300/303
See application file for complete search history.

(56) References Cited

U.S. PATENT DOCUMENTS

| | | | | |
|---|---|---|---|---|
| 10,198,671 | B1* | 2/2019 | Yang | G06K 9/6269 |
| 10,223,614 | B1* | 3/2019 | Kim | G06K 9/6262 |
| 10,229,346 | B1* | 3/2019 | Kim | G06K 9/6262 |
| 2013/0243246 | A1* | 9/2013 | Lao | G06K 9/00255 |
| | | | | 382/103 |
| 2016/0065931 | A1* | 3/2016 | Konieczny | H04N 13/111 |
| | | | | 348/42 |
| 2016/0148079 | A1* | 5/2016 | Shen | G06K 9/4628 |
| | | | | 382/157 |
| 2017/0011281 | A1* | 1/2017 | Dijkman | G06K 9/66 |
| 2017/0124409 | A1* | 5/2017 | Choi | G06N 3/0454 |
| 2017/0124415 | A1* | 5/2017 | Choi | G06N 3/08 |
| 2017/0169315 | A1* | 6/2017 | Vaca Castano | G06K 9/3233 |
| 2017/0206431 | A1* | 7/2017 | Sun | G06N 3/084 |
| 2018/0096457 | A1* | 4/2018 | Savvides | G06K 9/6267 |
| 2018/0137642 | A1* | 5/2018 | Malisiewicz | G06T 7/11 |
| 2018/0211403 | A1* | 7/2018 | Hotson | G06K 9/4604 |
| 2018/0268234 | A1* | 9/2018 | Yang | G06N 3/063 |
| 2019/0012548 | A1* | 1/2019 | Levi | G06K 9/00791 |
| 2019/0034734 | A1* | 1/2019 | Yen | G06K 9/00718 |
| 2019/0050681 | A1* | 2/2019 | Tate | G06K 9/6232 |
| 2019/0073553 | A1* | 3/2019 | Yao | G06K 9/46 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

METHOD AND DEVICE FOR MERGING OBJECT DETECTION INFORMATION DETECTED BY EACH OF OBJECT DETECTORS CORRESPONDING TO EACH CAMERA NEARBY FOR THE PURPOSE OF COLLABORATIVE DRIVING BY USING V2X-ENABLED APPLICATIONS, SENSOR FUSION VIA MULTIPLE VEHICLES

FIELD OF THE DISCLOSURE

The present disclosure relates to a method and a device for use with an autonomous vehicle; and more particularly, to the method and the device for merging object detection information detected by object detectors, each of which corresponds to each of cameras located nearby.

BACKGROUND OF THE DISCLOSURE

In general, deep learning is defined as a set of machine learning algorithms that try to achieve a high level of abstraction through a combination of various nonlinear transformation techniques, and is a field of machine learning that teaches computers how to think like people do.

A number of researches have been carried out to express data in the form that the computers can understand, for example, pixel information of an image as a column vector, and to apply it to the machine learning. As a result of this effort, a variety of deep learning techniques such as deep neural networks, convolutional neural networks, and recurrent neural networks have been applied to various fields like computer vision, voice recognition, natural language processing, and voice/signal processing, etc., and high performing deep learning networks have been developed.

Object detectors for analyzing images using the deep learning and detecting objects in the images have been applied to many industrial fields.

In particular, the object detectors are used for autonomous vehicles, mobile devices, surveillance systems, and the like, thereby improving user convenience and stability.

However, since conventional object detectors detect objects according to their learned parameters, it cannot be confirmed whether the objects are accurately detected in an actual situation, and thus the conventional object detectors require separate monitoring for the confirmation.

Also, the conventional object detectors have difficulty in securing various training data for improving performance.

In addition, since a system using the conventional object detectors can confirm only directions that a camera can see and scenes not occluded by obstacles, in case of blind spots and occluded scenes, the system cannot identify the actual situation.

In addition, the conventional object detectors may output different results depending on the learned parameters, so there may be discrepancies between information detected by other systems nearby.

SUMMARY OF THE DISCLOSURE

It is an object of the present disclosure to solve all the aforementioned problems.

It is another object of the present disclosure to prevent discrepancies between analysis results of images acquired from cameras nearby.

It is still another object of the present disclosure to detect objects located in undetectable areas like blind spots or areas occluded by obstacles.

It is still yet another object of the present disclosure to validate object detectors by securing accurate object detection information on surroundings.

It is still yet another object of the present disclosure to automatically generate training data using the accurate object detection information on surroundings.

In accordance with one aspect of the present disclosure, there is provided a method for merging object detection information detected by object detectors, each of which corresponds to each of cameras located nearby, wherein the object detectors detect objects in each of images generated from each of the cameras by image analysis based on deep learning, including steps of: (a) a specific merging device, corresponding to a specific object detector, among merging devices corresponding to the object detectors, if object detection information is acquired from the object detectors, each of which corresponds to each of the cameras located nearby, determining an order of degrees of each set of detection reliabilities of each of the object detectors by referring to the object detection information, wherein each piece of the object detection information includes one or more primary objects corresponding to one or more image-taking bodies whose corresponding cameras take each of the images and one or more secondary objects corresponding to one or more image-taken bodies appearing on at least part of the images generated by each of the cameras; and (b) the specific merging device, supposing that at least part of the object detectors are designated as a first object detector to an n-th object detector in a descending order of the degrees of each set of the detection reliabilities and that each piece of the object detection information acquired from each of the first object detector to the n-th object detector is designated as first object detection information to n-th object detection information, (i) confirming correspondence between first total objects in the first object detection information and second total objects in the second object detection information via at least one matching operation, by referring to the first object detection information and the second object detection information and generating first object merging information by merging the first total objects and the second total objects (ii) confirming correspondence between (k-2)-th objects included in the (k-2)-th object merging information and k-th objects in the k-th object detection information through the matching operation by referring to (k-2)-th object merging information and k-th object detection information, generating (k-1)-th object merging information by merging the (k-2)-th objects and the k-th objects, and re-projecting the (k-1)-th object merging information onto at least one specific image acquired from at least one specific camera corresponding to the specific object detector, by increasing k from 3 to n, wherein the first total objects include the primary objects and the secondary objects, and the second total objects include the primary objects and the secondary objects.

As one example, the method further includes a step of: (c) the specific merging device updating a specific detection reliability of the specific object detector by referring to a degree of similarity between the (k-1)-th object merging information and specific object detection information of the specific object detector.

As one example, the method further includes a step of: (d) the specific merging device auto-labeling (k-1)-th objects in the (k-1)-th object merging information, and learning at least part of one or more parameters of the specific object detector by referring to labels generated by the auto-labeling.

As one example, each piece of the object detection information includes information on each of the primary objects and information on each of the secondary objects, wherein the information on each of the primary objects includes status information on each of the primary objects and each set of the detection reliabilities of each of the object detectors corresponding to each of the primary objects, wherein the status information on each of the primary objects includes current location information, current direction information, and current speed information of each of the primary objects, and wherein the information on each of the secondary objects includes status information on each of the secondary objects and product information on each of the secondary objects wherein the status information on each of the secondary objects includes current location information, current direction information, and current speed information of each of the secondary object.

As one example, the information on each of the primary objects includes one of product information on each of the primary objects and each piece of product information of each of the object detectors corresponding to each of the primary objects.

As one example, at the step of (a), the specific merging device performs one of processes of (i) determining the order of degrees of each set of the detection reliabilities of each of the object detectors using the received detection reliabilities, (ii) determining the order of degrees of each set of the detection reliabilities of each of the object detectors by referring to preset first reliabilities corresponding to each piece of the product information of each of the object detectors, and (iii) determining the order of degrees of each set of the detection reliabilities of each of the object detectors by referring to a preset second reliability set as a base reliability if no feature information of the object detectors is acquired.

As one example, supposing that first total objects corresponding to one of the first object detection information and the (k-2)-th object merging information are designated as A1 to Ai and that second total objects corresponding to one of the second object detection information and the k-th object detection information are designated as B1 to Bj, wherein the first total objects include the primary objects and the secondary objects, and the second total objects include the primary objects and the secondary objects, at the step of (b), the specific merging device calculates cost of correspondence between said A1 to Ai and said B1 to Bj by the matching operation, and merges said A1 to Ai and said B1 to Bj according to the calculated cost.

As one example, the specific merging device calculates the cost of correspondence between said A1 to Ai and said B1 to Bj by using either any one of following (i) to (v) or a weighted sum of at least two of said (i) to (v), wherein said (i) represents one minus a first IoU which is an intersection over union of three dimensional cubes between one of said A1 to Ai and one of said B1 to Bj, wherein said (ii) represents one minus a second IoU which is an intersection over union of two dimensional rectangles resulting from projecting three dimensional cubes including one of said A1 to Ai and one of said B1 to Bj on a two dimensional plane from a bird's eye view, wherein said (iii) represents a Euclidean distance between centers of mass of one of said A1 to Ai and one of said B1 to Bj, wherein said (iv) represents an angle between one of said A1 to Ai and one of said B1 to Bj, and wherein said (v) represents a difference of speeds between one of said A1 to Ai and one of said B1 to Bj.

As one example, the specific merging device adds first undetected objects corresponding to either the first object detection information or the (k-2)-th object merging information by an amount of C1 to Cj such that the first undetected objects correspond to said B1 to Bj, and adds second undetected objects corresponding to either the second object detection information or the k-th object detection information by an amount of D1 to Di such that the second undetected objects correspond to said A1 to Ai, and the specific merging device calculates cost of correspondence between (i) said A1 to Ai and said C1 to Cj and (ii) said B1 to Bj and said D1 to Di, by the matching operation, and merges (i) said A1 to Ai and said C1 to Cj and (ii) said B1 to Bj and said D1 to Di.

As one example, the specific merging device determines (i) cost of correspondence between (i-1) one of said C1 to Cj and (i-2) one of said B1 to Bj and said D1 to Di and (ii) cost of correspondence between (ii-1) one of said D1 to Di and (ii-2) one of said A1 to Ai and said C1 to Cj, as preset initial values.

As one example, at the step of (b), the specific merging device, during a process of merging said A1 to Ai and said B1 to Bj according to the calculated cost, (i) merges status information on the first and the second total objects into a weighted sum with weights being the detection reliabilities corresponding to each of the first and the second total objects, and (ii) merges product information of a certain object detector whose sum of the detection reliabilities is a highest to product information on the first and the second total objects.

In accordance with another aspect of the present disclosure, there is provided a specific merging device, corresponding to a specific object detector, among merging devices for merging object detection information detected by object detectors, each of which corresponds to each of cameras located nearby, wherein the object detectors detect objects in each of images generated from each of the cameras by image analysis based on deep learning, including: at least one memory that stores instructions; and at least one processor configured to execute the instructions to: perform processes of: (I) if object detection information is acquired from the object detectors, each of which corresponds to each of the cameras located nearby, determining an order of degrees of each set of detection reliabilities of each of the object detectors by referring to the object detection information, wherein each piece of the object detection information includes one or more primary objects corresponding to one or more image-taking bodies whose corresponding cameras take each of the images and one or more secondary objects corresponding to one or more image-taken bodies appearing on at least part of the images generated by each of the cameras, and (II) supposing that at least part of the object detectors are designated as a first object detector to an n-th object detector in a descending order of the degrees of each set of the detection reliabilities and that each piece of the object detection information acquired from each of the first object detector to the n-th object detector is designated as first object detection information to n-th object detection information, (i) confirming correspondence between first total objects in the first object detection information and second total objects in the second object detection information via at least one matching operation, by referring to the first object detection information and the second object detection information and generating first object merging information by merging the first total objects and the second total objects (ii) confirming correspondence between (k-2)-th objects included in the (k-2)-th object merging information and k-th objects in the k-th object detection information through the matching operation by referring to (k-2)-th object merging information and k-th object detection information, generating (k-1)-th object merging information by merging the (k-2)-th objects and the k-th objects, and re-projecting the (k-1)-th object merging information onto at least one specific image acquired from at least one specific camera corresponding to the specific object detector, by increasing k from 3 to n, wherein the first total objects include the primary objects and the secondary objects, and the second total objects include the primary objects and the secondary objects.

As one example, the processor further performs a process of: (III) updating a specific detection reliability of the specific object detector by referring to a degree of similarity between the (k-1)-th object merging information and specific object detection information of the specific object detector.

As one example, the processor further performs a process of: (IV) auto-labeling (k-1)-th objects in the (k-1)-th object merging information, and learning at least part of one or more parameters of the specific object detector by referring to labels generated by the auto-labeling.

As one example, each piece of the object detection information includes information on each of the primary objects and information on each of the secondary objects, wherein the information on each of the primary objects includes status information on each of the primary objects and each set of the detection reliabilities of each of the object detectors corresponding to each of the primary objects, wherein the status information on each of the primary objects includes current location information, current direction information, and current speed information of each of the primary objects, and wherein the information on each of the secondary objects includes status information on each of the secondary objects and product information on each of the secondary objects wherein the status information on each of the secondary objects includes current location information, current direction information, and current speed information of each of the secondary object.

As one example, the information on each of the primary objects includes one of product information on each of the primary objects and each piece of product information of each of the object detectors corresponding to each of the primary objects.

As one example, at the process of (I), the processor performs one of processes of (i) determining the order of degrees of each set of the detection reliabilities of each of the object detectors using the received detection reliabilities, (ii) determining the order of degrees of each set of the detection reliabilities of each of the object detectors by referring to preset first reliabilities corresponding to each piece of the product information of each of the object detectors, and (iii) determining the order of degrees of each set of the detection reliabilities of each of the object detectors by referring to a preset second reliability set as a base reliability if no feature information of the object detectors is acquired.

As one example, supposing that first total objects corresponding to one of the first object detection information and the (k-2)-th object merging information are designated as A1 to Ai and that second total objects corresponding to one of the second object detection information and the k-th object detection information are designated as B1 to Bj, wherein the first total objects include the primary objects and the secondary objects, and the second total objects include the primary objects and the secondary objects, at the process of (II), the processor calculates cost of correspondence between said A1 to Ai and said B1 to Bj by the matching operation, and merges said A1 to Ai and said B1 to Bj according to the calculated cost.

As one example, the processor calculates the cost of correspondence between said A1 to Ai and said B1 to Bj by using either any one of following (i) to (v) or a weighted sum of at least two of said (i) to (v), wherein said (i) represents one minus a first IoU which is an intersection over union of three dimensional cubes between one of said A1 to Ai and one of said B1 to Bj, wherein said (ii) represents one minus a second IoU which is an intersection over union of two dimensional rectangles resulting from projecting three dimensional cubes including one of said A1 to Ai and one of said B1 to Bj on a two dimensional plane from a bird's eye view, wherein said (iii) represents a Euclidean distance between centers of mass of one of said A1 to Ai and one of said B1 to Bj, wherein said (iv) represents an angle between one of said A1 to Ai and one of said B1 to Bj, and wherein said (v) represents a difference of speeds between one of said A1 to Ai and one of said B1 to Bj.

As one example, the processor adds first undetected objects corresponding to either the first object detection information or the (k-2)-th object merging information by an amount of C1 to Cj such that the first undetected objects correspond to said B1 to Bj, and adds second undetected objects corresponding to either the second object detection information or the k-th object detection information by an amount of D1 to Di such that the second undetected objects correspond to said A1 to Ai, and the processor calculates cost of correspondence between (i) said A1 to Ai and said C1 to Cj and (ii) said B1 to Bj and said D1 to Di, by the matching operation, and merges (i) said A1 to Ai and said C1 to Cj and (ii) said B1 to Bj and said D1 to Di.

As one example, the processor determines (i) cost of correspondence between (i-1) one of said C1 to Cj and (i-2) one of said B1 to Bj and said D1 to Di and (ii) cost of correspondence between (ii-1) one of said D1 to Di and (ii-2) one of said A1 to Ai and said C1 to Cj, as preset initial values.

As one example, at the process of (II), the processor, during a process of merging said A1 to Ai and said B1 to Bj according to the calculated cost, (i) merges status information on the first and the second total objects into a weighted sum with weights being the detection reliabilities corresponding to each of the first and the second total objects, and (ii) merges product information of a certain object detector whose sum of the detection reliabilities is a highest to product information on the first and the second total objects.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
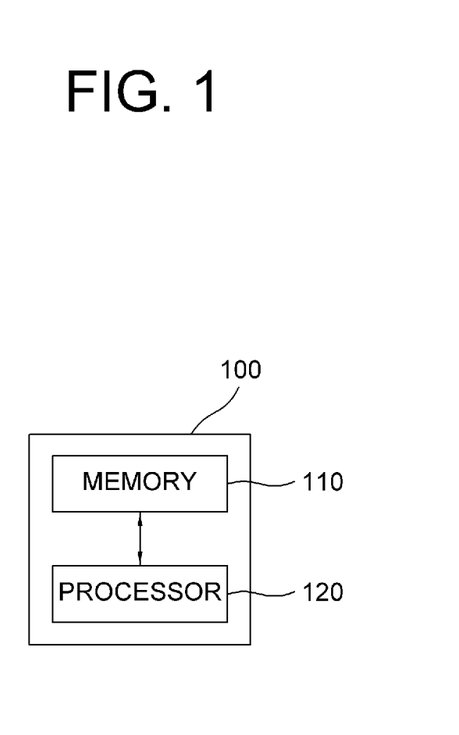
FIG. 1 is a drawing schematically illustrating a merging device for merging object detection information detected by each of object detectors corresponding to each of cameras nearby in accordance with one example of the present disclosure.

FIG. 1 is a drawing schematically illustrating a merging device for merging object detection information detected by each of object detectors corresponding to each of cameras nearby in accordance with one example of the present disclosure. By referring to FIG. 1, a merging device 100 may include a memory 110 for storing instructions to merge the object detection information detected by each of the object detectors corresponding to each of the cameras nearby, and a processor 120 for performing processes corresponding to the instructions in the memory 110 to merge the object detection information detected by each of the object detectors corresponding to each of the cameras nearby. Herein, the cameras nearby may be one or more cameras located within a certain radius, or may be one or more cameras located in a certain space, but the scope of the present disclosure is not limited thereto.

Specifically, the merging device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

A method for merging the object detection information detected by each of the object detectors corresponding to each of the cameras nearby using the merging device 100 in accordance with one example of the present disclosure is described as follows.

Figure 2:
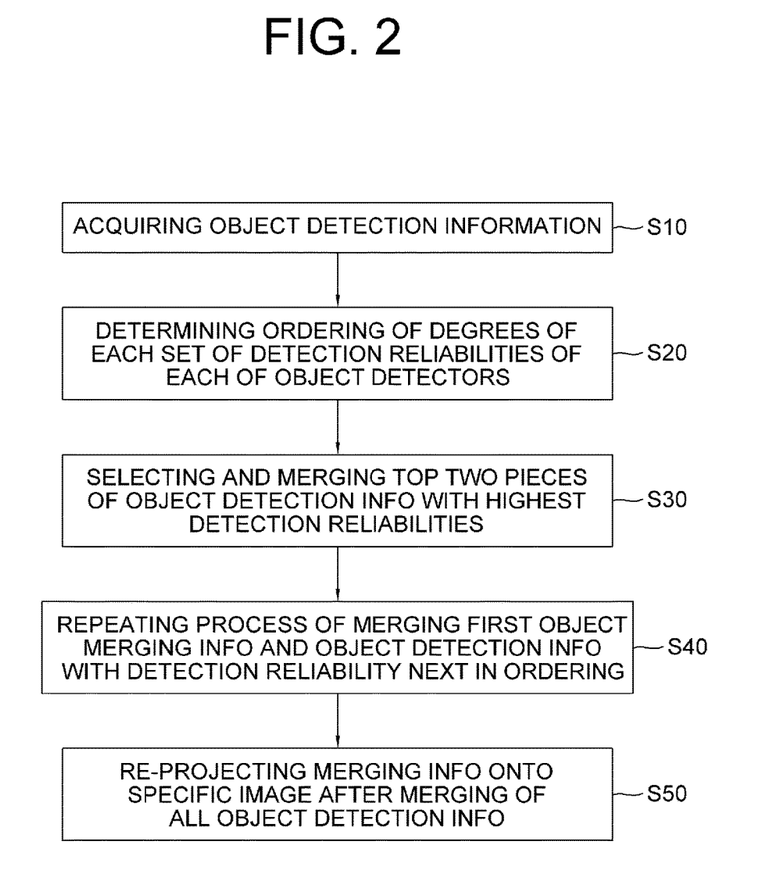
FIG. 2 is a drawing schematically illustrating a merging method for merging the object detection information detected by each of the object detectors corresponding to each of the cameras nearby in accordance with one example of the present disclosure.

First, the merging device 100 may acquire or support another device to acquire the object detection information from each of the object detectors corresponding to each of the cameras located nearby at a step of S10.

Herein, each of the object detectors may correspond to each of the cameras located nearby, and may detect one or more objects in each of images generated from each of the cameras by image analysis based on a deep learning.

Figure 3:
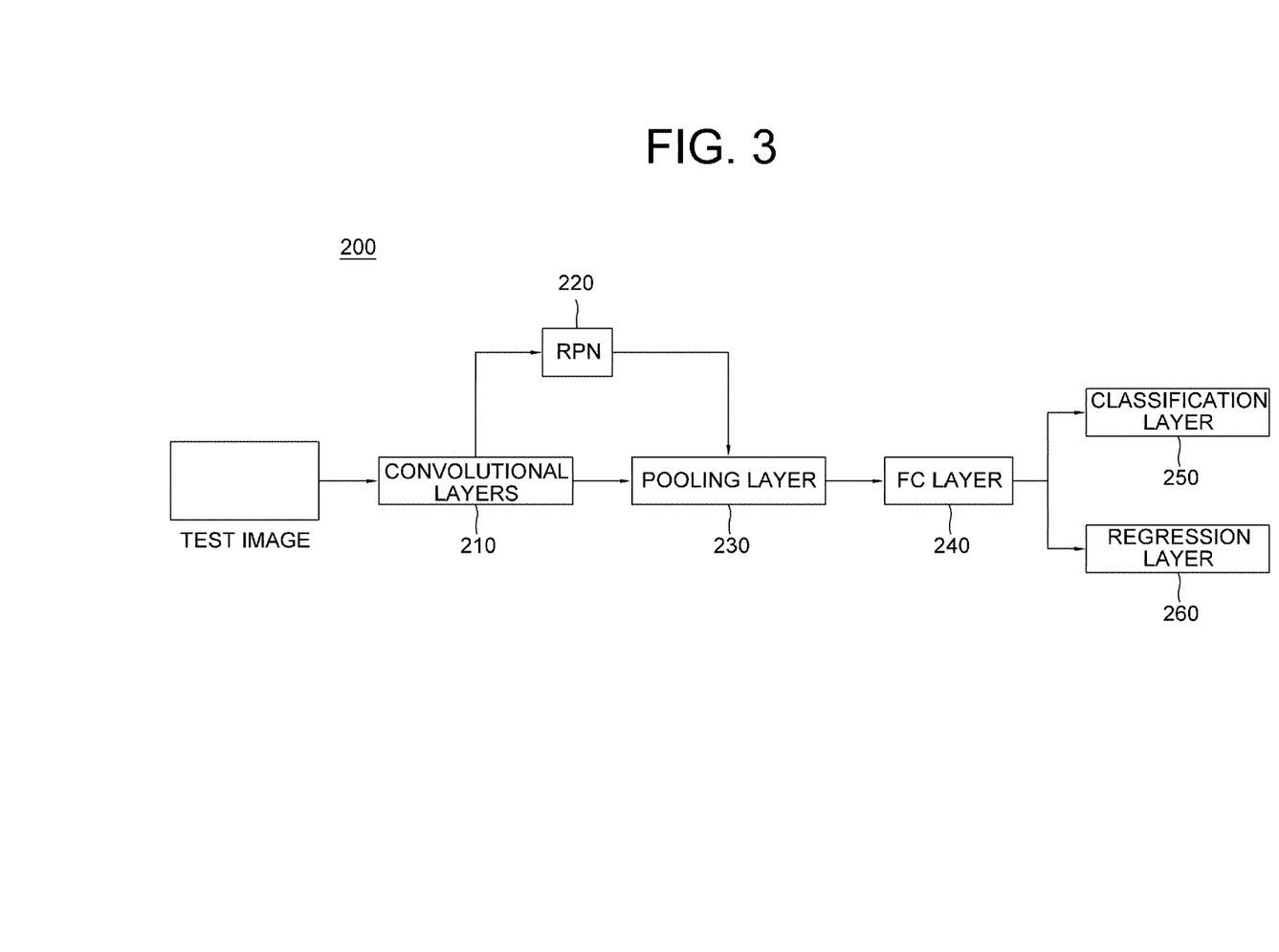
FIG. 3 is a drawing schematically illustrating a process of the object detectors detecting one or more objects in at least one image in a method for merging the object detection information detected by each of the object detectors corresponding to each of the cameras nearby in accordance with one example of the present disclosure.

As one example, if at least one test image taken by the camera is inputted, the object detector 200 may instruct one or more convolutional layers 210 to apply one or more convolution operations to the test image, to thereby generate at least one feature map. Herein, the convolutional layers 210 may generate the feature map by sequentially applying the convolution operations to the test image.

Then the object detector 200 may instruct at least one RPN (Region Proposal Network) 220 to generate proposal boxes corresponding to candidate regions, estimated as including the objects, on the feature map.

Thereafter, the object detector 200 may instruct at least one pooling layer 230 to generate one or more feature vectors by applying one or more pooling operations to regions, corresponding to the proposal boxes, on the feature map.

And the object detector 200 may instruct at least one FC (fully connected) layer 240 to apply at least one fully-connected operation to the feature vectors, instruct at least one classification layer 250 to output each piece of object class information corresponding to each of the proposal boxes, and instruct at least one regression layer 260 to generate the bounding boxes resulting from each of the proposal boxes bounding each of the objects.

Meanwhile, the cameras corresponding to the object detectors may be mounted on autonomous vehicles, mobile devices, surveillance systems, etc., but the scope of the present disclosure is not limited thereto.

Also, each of merging devices corresponding to each of the object detectors may transmit the object detection information to merging devices of other object detectors corresponding to the cameras nearby by wired and wireless communication.

Herein, each piece of the object detection information may include one or more primary objects corresponding to one or more image-taking bodies whose corresponding cameras take each of the images and one or more secondary objects corresponding to one or more image-taken bodies appearing on at least part of the images generated by each of the cameras. Herein, at least one of the primary objects and at least one of the secondary objects may represent at least one same object. That is, a specific object may be one of the primary objects taking the images of other objects and simultaneously be one of the secondary objects whose images are taken by at least part of said other objects.

Each piece of the object detection information may include information on the primary objects and information on the secondary objects.

And, the information on each of the primary objects may include status information on each of the primary objects and each set of detection reliabilities of each of the object detectors corresponding to each of the primary objects, where the status information on each of the primary objects may include current location information, current direction information, current speed information, etc. of each of the primary objects. Herein, the current direction information and the current speed information of each of the primary objects may include not only relative speed information and relative direction information of the moving secondary objects to the primary object at rest but also speed information and direction information of the moving primary object.

Also, the information on each of the primary objects may include product information on each of the primary objects having a manufacturer, a model, a year, color, etc. of each of the primary objects, and product information on each of the object detectors corresponding to each of the primary objects. Herein, the product information on each of the object detectors may include manufacturers, models, years of manufacturing, etc. of the object detectors.

In addition, the information on each of the secondary objects may include status information on each of the secondary objects and product information on each of the secondary objects. And, the status information on each of the secondary objects may include current location information, current direction information, current speed information, etc. of each of the secondary objects, and product information on each of the secondary objects may include a manufacturer, a model, a year of manufacturing, color, etc. of each of the secondary objects. Herein, the current direction information and the current speed information of each of the secondary objects may include not only relative speed information and relative direction information of the moving primary objects to the secondary object at rest but also speed information and direction information of the moving secondary object.

Meanwhile, the scope of the present disclosure is not limited thereto, and every information related to the primary objects and the secondary objects may be included.

Next, each of the merging devices 100 may determine an ordering of degrees of each set of the detection reliabilities of each of the object detectors by referring to the object detection information at a step of S20.

That is, a specific merging device 100, corresponding to a specific object detector, among each of the merging devices corresponding to each of the object detectors, may determine the ordering of degrees of each set of the detection reliabilities of each of the object detectors by referring to the object detection information. Although the description below explains the specific merging device only, for convenience of explanation, it should be noted that each and every merging device is capable of merging the object detection information.

Herein, the specific merging device 100 may recognize the ordering of degrees of each set of the detection reliabilities of each of the object detectors after receiving the received detection reliabilities of the object detectors.

However, if no detection reliabilities are present or acquired, the specific merging device 100 may determine the ordering of degrees of each set of the detection reliabilities of each of the object detectors by referring to preset first reliabilities corresponding to each piece of the product information of each of the object detectors. That is, the specific merging device 100 may determine the ordering of degrees of each set of the detection reliabilities of each of the object detectors by confirming the preset first reliabilities corresponding to each manufacturer, each model, and each year of manufacturing of each of the object detectors.

Also, if no product information of the object detectors is present, the specific merging device 100 may determine the ordering of degrees of each set of the detection reliabilities of each of the object detectors by referring to a preset second reliability which is set as a base reliability. That is, if no product information of the object detectors is present, the specific merging device 100 may determine the ordering of degrees of each set of the detection reliabilities of each of the object detectors by using the base reliability which is set as a default, at the step of S20.

Next, the specific merging device 100 may select and merge two pieces of the object detection information with top two detection reliabilities at a step of S30.

That is, supposing that at least part of the object detectors are designated as a first object detector to an n-th object detector in a descending order of degrees of each set of the detection reliabilities and that each piece of the object detection information acquired from each of the first object detector to the n-th object detector is designated as first object detection information to n-th object detection information, the specific merging device 100 may perform or support another device to perform processes of confirming correspondence between information on first total objects in the first object detection information and information on second total objects in the second object detection information via at least one matching operation, by referring to the first object detection information and the second object detection information, and generating first object merging information by merging the information on the first total objects and the information on the second total objects, where the first total objects may include the primary objects and the secondary objects, and the second total objects may also include the primary objects and the secondary objects.

As one example, by referring to FIG. 4, a merging process of the first object detection information and the second object detection information is described below. Vehicles are shown as exemplar objects in FIG. 4, but the scope of the present disclosure is not limited thereto.

In a situation where multiple vehicles with their own object detectors are being driven and performing their own object detection, because each video inputted from each of the object detectors is different, regions to search for objects may be different and information on the detected objects may also be different.

That is, the object detection information based on an object A1 may include the primary object A1 and the secondary objects A2, A3, . . . , and Ai detected by image analysis. That is, the first object detection information 10 may include first total objects A1 to Ai.

And, the object detection information based on an object B1 may include the primary object B1 and the secondary objects B2, B3, . . . , and Bj detected by the image analysis. That is, the second object detection information 20 may include second total objects B1 to Bj. Herein, information on the primary object included in the object detection information is not acquired by the object detection using visual recognition, but may be acquired by a certain sensor detecting a direction, a speed, etc. of the primary object, or by preset product information. Of course, the scope of the present disclosure is not limited thereto.

Then, the specific merging device 100 may calculate cost of correspondence between A1 to Ai in the first object detection information 10 and B1 to Bj in the second object detection information 20 by using the matching operation, e.g., a bipartite matching, and may merge said A1 to Ai and said B1 to Bj according to the calculated cost.

Herein, the specific merging device 100 may calculate the cost by referring to one minus a first IoU (intersection over union) and one minus a second IoU. Herein, the first IoU may be an intersection over union of three dimensional cubes between one of said A1 to Ai in the first object detection information 10 and one of said B1 to Bj in the second object detection information 20, and the second IoU may be an intersection over union of two dimensional rectangles resulting from projecting three dimensional cubes including one of said A1 to Ai in the first object detection information 10 and one of said B1 to Bj in the second object detection information on a two dimensional plane from a bird's eye view.

Also, the specific merging device 100 may calculate the cost by referring to a Euclidean distance between a center of mass of one of said A1 to Ai in the first object detection information 10 and that of one of said B1 to Bj in the second object detection information 20, an angle between one of said A1 to Ai and one of said B1 to Bj, and a difference of speeds between one of said A1 to Ai and one of said B1 to Bj.

In addition, the specific merging device 100 may calculate the cost by using a weighted sum of at least two of one minus the first IoU, one minus the second IoU, the Euclidean distance between the centers of mass of one of said A1 to Ai and one of said B1 to Bj, the angle between one of said A1 to Ai and one of said B1 to Bj, and the difference of speeds between one of said A1 to Ai and one of said B1 to Bj.

For example, the cost of correspondence between the first total objects in the first object detection information 10 and the second total objects in the second object detection information may be represented as follows. Herein, an example where the respective numbers of the first total objects and the second total objects are three's is shown.

TABLE 1

|  | B1 | B2 | B3 | D1 (un-detected) | D2 (un-detected) | D3 (un-detected) |
|---|---|---|---|---|---|---|
| A1 | 50 | 2 (*) | 70 | 10 | 10 | 10 |
| A2 | 150 | 50 | 100 | 10 (*) | 10 (*) | 10 (*) |
| A3 | 150 | 70 | 3 (*) | 10 | 10 | 10 |
| C1 (un-detected) | 10 (*) | 10 | 10 | 10 | 10 | 10 |
| C2 (un-detected) | 10 (*) | 10 | 10 | 10 | 10 | 10 |
| C3 (un-detected) | 10 (*) | 10 | 10 | 10 | 10 | 10 |

By referring to Table 1, the objects A1 and B2 correspond to each other, the objects A3 and B3 correspond to each other.

Therefore, the specific merging device 100 may merge A1 to Ai in the first object detection information 10 and B1 to Bj in the second object detection information 20 according to the calculated cost.

Figure 4:
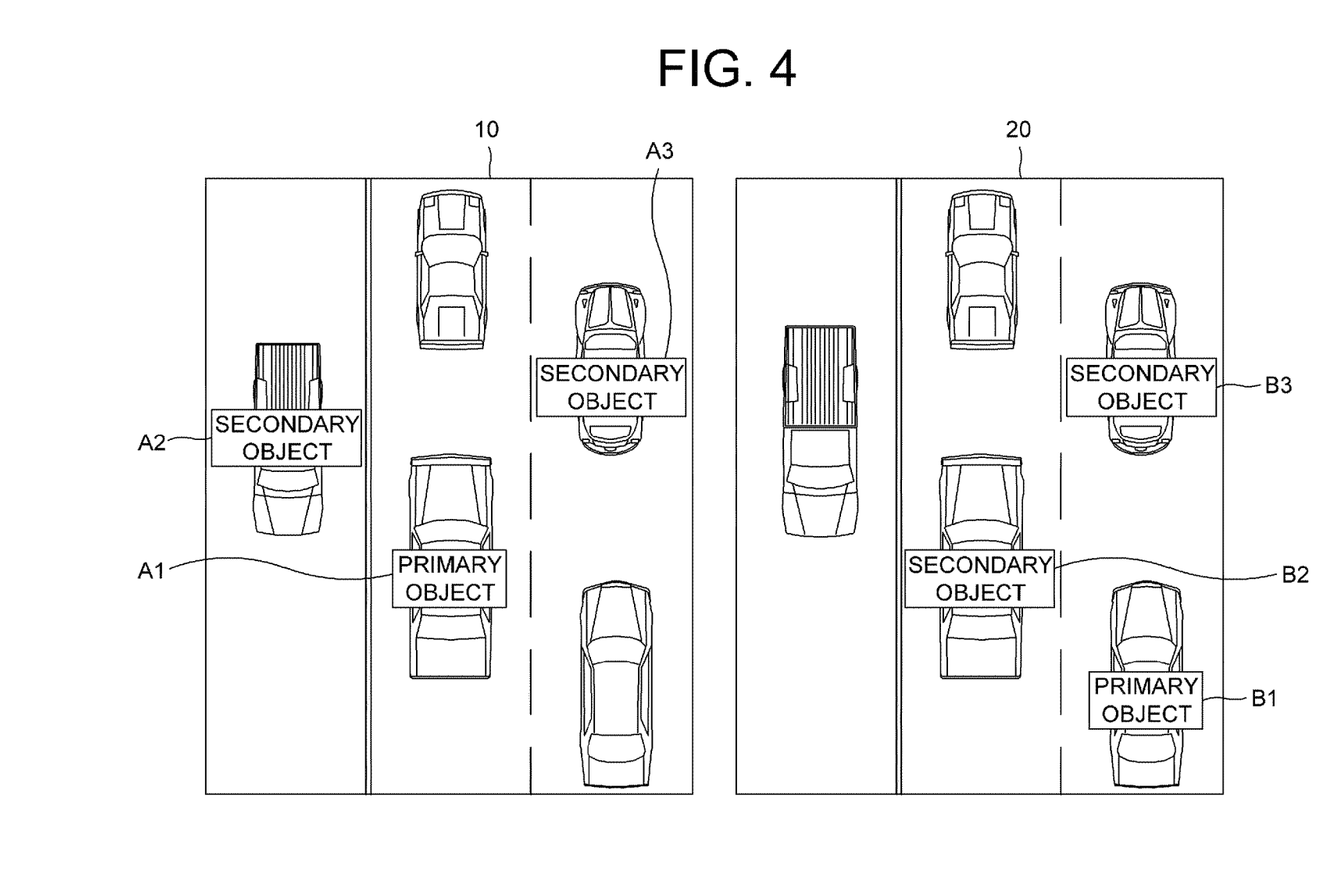
FIG. 4 is a drawing schematically illustrating an example of a merging result of the object detection information detected by each of the object detectors corresponding to each of the cameras nearby in accordance with one example of the present disclosure.

That is, by referring to FIG. 4 and Table 1, first object merging information resulting from merging the first object detection information 10 and the second object detection information 20 may include A1B2, A2, A3B3, and B1.

Herein, the specific merging device 100 may also merge information on the objects while the first object detection information 10 and the second object detection information 20 are being merged.

As one example, the status information on objects to be merged whose elements can be expressed as numbers like the current location information, the current direction information, the current speed information, etc. of the objects to be merged may be merged by using a weighted sum using each of the detection reliabilities of each of the object detectors corresponding to the objects to be merged. That is, supposing that the status information on the objects to be merged in the first object detection information is first information and that the status information on the objects to be merged in the second object detection information is second information, the first object merging information may be the status information on merged objects in the first object merging information into which the first object detection information and the second object detection information are merged, and may be expressed as $$\left(\frac{\text{the first reliability}}{\text{the first reliability} + \text{the second reliability}} \times \text{the first information}\right) +$$

$$\left(\frac{\text{the second reliability}}{\text{the first reliability} + \text{the second reliability}} \times \text{the second information}\right).$$

The product information of the objects such as manufacturers, models, years of manufacturing, colors, etc. may be selected for merging into the object merging information such that a sum of one or more detection reliabilities corresponding to one or more object detectors is highest. For example, supposing that, for a specific object to be merged, the first object detection information is a first manufacturer, that the second object detection information is a second manufacturer, and that the third object detection information is the first manufacturer, a sum of the detection reliabilities of the first manufacturer may be the first detection reliability plus the third detection reliability, a sum of the detection reliabilities of the second manufacturer may be the second detection reliability, and accordingly, between a second detection reliability and a first detection reliability plus a third detection reliability, the first manufacturer or the second manufacturer, whichever has the higher detection probability, may be selected for the object merging information to be used. Taking a more specific example of a black vehicle traveling at 50 mph, information A detected by one detector may have "bounding box information of the vehicle, 40 mph, black", and information B detected by another detector may have "bounding box information of the vehicle, 50 mph, gray". Thus, whether two pieces of the information A and B are identical is confirmed by using cost of correspondence, and then the two pieces are merged by referring to the bounding box information, the speed information, etc. The speed information is merged into a weighted sum, e.g., w1×speed A+w2×speed B, 45 mph in case of the same detection reliabilities. But such a weighted sum cannot calculated for colors, thus black (the first detection reliability) or gray (the second detection reliability) may be selected for merging according to the detection reliabilities. That is, if two of the object detectors detect the vehicle as black, one of the object detectors detect the vehicle as gray, and two of the object detectors detect the vehicle as yellow, then the object merging information may include product information having a highest sum of the detection reliabilities among a sum of the detection reliabilities of the object detectors of black, a sum of the detection reliabilities of the object detectors of gray, and a sum of the detection reliabilities of the object detectors of yellow.

Meanwhile, in case a specific object in the first object detection information is not included in the second object detection information, there may be no correspondence.

Therefore, the specific merging device 100 may add first undetected objects corresponding to the first object detection information 10 by an amount of C1 to Cj such that the first undetected objects correspond to said B1 to Bj, may add second undetected objects corresponding to the second object detection information 20 by an amount of D1 to Di such that the second undetected objects correspond to said A1 to Ai, and may calculate cost of correspondence between (i) said A1 to Ai and said C1 to Cj and (ii) said B1 to Bj and said D1 to Di by a certain matching operation as in Table 1. Herein, one or more undetected objects may include objects that are out of a line of sight of one of the detectors or objects that are occluded by one or more obstacles despite the objects within the line of sight. That is, for example, the undetected objects may be not detected by the object detector which generated the first object detection information due to occlusion or the blind spots, but may be detected by the object detector which generated the second object detection information.

Herein, the specific merging device 100 determine (i) cost of correspondence between (i-1) one of said C1 to Cj and (i-2) one of said B1 to Bj and said D1 to Di and (ii) cost of correspondence between (ii-1) one of said D1 to Di and (ii-2) one of said A1 to Ai and said C1 to Cj, as preset initial values. Then, the preset initial values may function as thresholds used for determining the correspondence between the objects, and objects without cost less than the preset initial values may be determined as the undetected objects. That is, in Table 1, because there is no value less than the preset initial value 10 among costs of A2 with B1, B2, and B3, A2 in the second object detection information 20 may be determined as an undetected object. Also, because there is no value less than the preset initial value 10 among costs of B1 with A1, A2, and A3, B1 in the first object detection information 10 may be determined as an undetected object.

Next, the specific merging device 100 may merge the first object detection information and the second object detection information with highest detection reliabilities into the first object merging information by the processes above, and may repeat a process of merging the first object merging information and the object detection information with a detection reliability next in the ordering, at a step of S40.

That is, the specific merging device 100 may confirm correspondence between (k-2)-th objects included in the (k-2)-th object merging information and k-th objects in the k-th object detection information through the matching operation by referring to (k-2)-th object merging information and k-th object detection information, and may generate (k-1)-th object merging information by merging the (k-2)-th objects and the k-th objects, by increasing k from 3 to n.

And, the (k-1)-th object merging information may result from repeating a process of merging the object merging information acquired previously and the object detection information next in the ordering, for example, the first object merging information into which the first object detection information and the second object detection information are merged, and the second object merging information into which the first object merging information and the third object merging information are merged.

Herein, the (k-1)-th object merging information may result from merging object information in at least part of the object detection information, among the first object detection information to n-th object detection information, determined as respectively including information on at least one same object according to the correspondence. As one example, by referring to FIG. 4 and Table 1, the first object merging information resulting from merging the first object detection information 10 and the second object detection information 20 may include A1B2, A2, A3B3, and B1. Herein, A1 and B2 may be determined as a same object, and then information on A1 in the first object detection information and information on B2 in the second object detection information may be merged into the object merging information of A1B2, and A3 and B3 may be determined as a same object, and then information on A3 in the first object detection information and information on B3 in the second object detection information may be merged into the object merging information of A3B3.

Next, the specific merging device 100 may re-project the (k-1)-th object merging information onto a specific image acquired from a specific camera corresponding to the specific object detector, at a step of S50. One or more objects located in at least one area that cannot be detected by the object detector may be identified by such a process.

Also, the specific merging device 100 may update a specific detection reliability of the specific object detector by referring to a degree of similarity between the (k-1)-th object merging information and specific object detection information of the specific object detector.

As one example, the specific merging device 100 may calculate cost of correspondence between the (k-1)-th object merging information and the specific object detection information of the specific object detector. Then, weights to be used for updating the specific detection reliability by referring to the calculated cost, and the specific detection reliability may be updated using the weights. That is, the specific merging device 100 may calculate cost of correspondence between the (k-1)-th object merging information and each piece of the object detection information of each of the object detectors, may calculate weights of the detection reliabilities by $$\frac{1}{\sum_{i=1}^{n} \exp(-|cost|)}$$

or $$\frac{1}{\sum_{i=1}^{n} \exp(-cost^2)},$$

and may update the specific detection reliability by using the calculated the weights of the detection reliabilities.

Also, the specific merging device 100 may auto-label (k-1)-th objects in the (k-1)-th object merging information, and may learn at least part of one or more parameters of the specific object detector by referring to labels generated by the auto-labeling.

That is, the specific merging device 100 may perform auto-labeling by using information on merged objects on videos acquired from different vehicles or surveillance cameras.

Herein, invariant information like car manufacturers, models, years, colors which is independent of the cameras or locations thereof may be used as labels without additional processes. And mutable information like locations, directions, speeds which is prone to change according to the cameras or the locations thereof may be re-projected onto image planes of the cameras and then used as the labels.

In addition, the specific merging device 100 may evaluate performance of each of the object detectors with an assumption that the labels generated by auto-labeling are ground truths. That is, the performance of the object detectors may be validated by confirming whether the labels from auto-labeling satisfy specifications required for performance evaluation.

The present disclosure has an effect of acquiring accurate information on areas unrecognizable due to the blind spots or the occlusion by merging the detection information of the object detectors using the cameras nearby.

The present disclosure has another effect of preventing discrepancies between analysis results of images by merging the detection information of the object detectors using the cameras nearby.

The present disclosure has still another effect of acquiring accurate detection information on surroundings by merging the detection information of the object detectors using the cameras nearby, and acquiring detection information as training data.

The present disclosure has still yet another effect of acquiring accurate detection information on surroundings by merging the detection information of the object detectors using the cameras nearby, and validating the object detectors.

To acquire the aforementioned information, V2X-based auto labeling and evaluation may be used in the method. Further, the method can be used for a collaborative driving or an HD map update through V2X-enabled applications, sensor fusion via multiple vehicles, and the like.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for merging object detection information detected by object detectors, each of which corresponds to each of cameras located nearby, wherein the object detectors detect objects in each of images generated from each of the cameras by image analysis based on deep learning, comprising steps of:

(a) a specific merging device, corresponding to a specific object detector, among merging devices corresponding to the object detectors, if object detection information is acquired from the object detectors, each of which corresponds to each of the cameras located nearby, determining an order of degrees of each set of detection reliabilities of each of the object detectors by referring to the object detection information, wherein each piece of the object detection information includes one or more primary objects corresponding to one or more image-taking bodies whose corresponding cameras take each of the images and one or more secondary objects corresponding to one or more image-taken bodies appearing on at least part of the images generated by each of the cameras; and (b) the specific merging device, supposing that at least part of the object detectors are designated as a first object detector to an n-th object detector in a descending order of the degrees of each set of the detection reliabilities and that each piece of the object detection information acquired from each of the first object detector to the n-th object detector is designated as first object detection information to n-th object detection information, (i) confirming correspondence between first total objects in the first object detection information and second total objects in the second object detection information via at least one matching operation, by referring to the first object detection information and the second object detection information and generating first object merging information by merging the first total objects and the second total objects (ii) confirming correspondence between (k-2)-th objects included in the (k-2)-th object merging information and k-th objects in the k-th object detection information through the matching operation by referring to (k-2)-th object merging information and k-th object detection information, generating (k-1)-th object merging information by merging the (k-2)-th objects and the k-th objects, and re-projecting the (k-1)-th object merging information onto at least one specific image acquired from at least one specific camera corresponding to the specific object detector, by increasing k from 3 to n, wherein the first total objects include the primary objects and the secondary objects, and the second total objects include the primary objects and the secondary objects.

2. The method of claim 1, wherein the method further comprises a step of:
(c) the specific merging device updating a specific detection reliability of the specific object detector by referring to a degree of similarity between the (k-1)-th object merging information and specific object detection information of the specific object detector.

3. The method of claim 1, wherein the method further comprises a step of:
(d) the specific merging device auto-labeling (k-1)-th objects in the (k-1)-th object merging information, and learning at least part of one or more parameters of the specific object detector by referring to labels generated by the auto-labeling.

4. The method of claim 1, wherein each piece of the object detection information includes information on each of the primary objects and information on each of the secondary objects,
wherein the information on each of the primary objects includes status information on each of the primary objects and each set of the detection reliabilities of each of the object detectors corresponding to each of the primary objects, wherein the status information on each of the primary objects includes current location information, current direction information, and current speed information of each of the primary objects, and
wherein the information on each of the secondary objects includes status information on each of the secondary objects and product information on each of the secondary objects wherein the status information on each of the secondary objects includes current location information, current direction information, and current speed information of each of the secondary object.

5. The method of claim 4, wherein the information on each of the primary objects includes one of product information on each of the primary objects and each piece of product information of each of the object detectors corresponding to each of the primary objects.

6. The method of claim 5, wherein, at the step of (a), the specific merging device performs one of processes of (i) determining the order of degrees of each set of the detection reliabilities of each of the object detectors using the received detection reliabilities, (ii) determining the order of degrees of each set of the detection reliabilities of each of the object detectors by referring to preset first reliabilities corresponding to each piece of the product information of each of the object detectors, and (iii) determining the order of degrees of each set of the detection reliabilities of each of the object detectors by referring to a preset second reliability set as a base reliability if no feature information of the object detectors is acquired.

7. The method of claim 1, wherein, supposing that first total objects corresponding to one of the first object detection information and the (k-2)-th object merging information are designated as A1 to Ai and that second total objects corresponding to one of the second object detection information and the k-th object detection information are designated as B1 to Bj, wherein the first total objects include the primary objects and the secondary objects, and the second total objects include the primary objects and the secondary objects,
at the step of (b), the specific merging device calculates cost of correspondence between said A1 to Ai and said B1 to Bj by the matching operation, and merges said A1 to Ai and said B1 to Bj according to the calculated cost.

8. The method of claim 7, wherein the specific merging device calculates the cost of correspondence between said A1 to Ai and said B1 to Bj by using either any one of following (i) to (v) or a weighted sum of at least two of said (i) to (v), wherein said (i) represents one minus a first IoU which is an intersection over union of three dimensional cubes between one of said A1 to Ai and one of said B1 to Bj, wherein said (ii) represents one minus a second IoU which is an intersection over union of two dimensional rectangles resulting from projecting three dimensional cubes including one of said A1 to Ai and one of said B1 to Bj on a two dimensional plane from a bird's eye view, wherein said (iii) represents a Euclidean distance between centers of mass of one of said A1 to Ai and one of said B1 to Bj, wherein said (iv) represents an angle between one of said A1 to Ai and one of said B1 to Bj, and wherein said (v) represents a difference of speeds between one of said A1 to Ai and one of said B1 to Bj.

9. The method of claim 7, wherein the specific merging device adds first undetected objects corresponding to either the first object detection information or the (k-2)-th object merging information by an amount of C1 to Cj such that the first undetected objects correspond to said B1 to Bj, and adds second undetected objects corresponding to either the second object detection information or the k-th object detection information by an amount of D1 to Di such that the second undetected objects correspond to said A1 to Ai, and
wherein the specific merging device calculates cost of correspondence between (i) said A1 to Ai and said C1 to Cj and (ii) said B1 to Bj and said D1 to Di, by the matching operation, and merges (i) said A1 to Ai and said C1 to Cj and (ii) said B1 to Bj and said D1 to Di.

10. The method of claim 9, wherein the specific merging device determines (i) cost of correspondence between (i-1) one of said C1 to Cj and (i-2) one of said B1 to Bj and said D1 to Di and (ii) cost of correspondence between (ii-1) one of said D1 to Di and (ii-2) one of said A1 to Ai and said C1 to Cj, as preset initial values.

11. The method of claim 7, wherein, at the step of (b), the specific merging device, during a process of merging said A1 to Ai and said B1 to Bj according to the calculated cost, (i) merges status information on the first and the second total objects into a weighted sum with weights being the detection reliabilities corresponding to each of the first and the second total objects, and (ii) merges product information of a certain object detector whose sum of the detection reliabilities is a highest to product information on the first and the second total objects.

12. A specific merging device, corresponding to a specific object detector, among merging devices for merging object detection information detected by object detectors, each of which corresponds to each of cameras located nearby, wherein the object detectors detect objects in each of images generated from each of the cameras by image analysis based on deep learning, comprising:
at least one memory that stores instructions; and
at least one processor configured to execute the instructions to: perform processes of: (I) if object detection information is acquired from the object detectors, each of which corresponds to each of the cameras located nearby, determining an order of degrees of each set of detection reliabilities of each of the object detectors by referring to the object detection information, wherein each piece of the object detection information includes one or more primary objects corresponding to one or more image-taking bodies whose corresponding cameras take each of the images and one or more secondary objects corresponding to one or more image-taken bodies appearing on at least part of the images generated by each of the cameras, and (II) supposing that at least part of the object detectors are designated as a first object detector to an n-th object detector in a descending order of the degrees of each set of the detection reliabilities and that each piece of the object detection information acquired from each of the first object detector to the n-th object detector is designated as first object detection information to n-th object detection information, (i) confirming correspondence between first total objects in the first object detection information and second total objects in the second object detection information via at least one matching operation, by referring to the first object detection information and the second object detection information and generating first object merging information by merging the first total objects and the second total objects (ii) confirming correspondence between (k-2)-th objects included in the (k-2)-th object merging information and k-th objects in the k-th object detection information through the matching operation by referring to (k-2)-th object merging information and k-th object detection information, generating (k-1)-th object merging information by merging the (k-2)-th objects and the k-th objects, and re-projecting the (k-1)-th object merging information onto at least one specific image acquired from at least one specific camera corresponding to the specific object detector, by increasing k from 3 to n, wherein the first total objects include the primary objects and the secondary objects, and the second total objects include the primary objects and the secondary objects.

13. The specific merging device of claim 12, wherein the processor further performs a process of:
(III) updating a specific detection reliability of the specific object detector by referring to a degree of similarity between the (k-1)-th object merging information and specific object detection information of the specific object detector.

14. The specific merging device of claim 12, wherein the processor further performs a process of:
(IV) auto-labeling (k-1)-th objects in the (k-1)-th object merging information, and learning at least part of one or more parameters of the specific object detector by referring to labels generated by the auto-labeling.

15. The specific merging device of claim 12, wherein each piece of the object detection information includes information on each of the primary objects and information on each of the secondary objects,
wherein the information on each of the primary objects includes status information on each of the primary objects and each set of the detection reliabilities of each of the object detectors corresponding to each of the primary objects, wherein the status information on each of the primary objects includes current location information, current direction information, and current speed information of each of the primary objects, and
wherein the information on each of the secondary objects includes status information on each of the secondary objects and product information on each of the secondary objects wherein the status information on each of the secondary objects includes current location information, current direction information, and current speed information of each of the secondary object.

16. The specific merging device of claim 15, wherein the information on each of the primary objects includes one of product information on each of the primary objects and each piece of product information of each of the object detectors corresponding to each of the primary objects.

17. The specific merging device of claim 16, wherein, at the process of (I), the processor performs one of processes of (i) determining the order of degrees of each set of the detection reliabilities of each of the object detectors using the received detection reliabilities, (ii) determining the order of degrees of each set of the detection reliabilities of each of the object detectors by referring to preset first reliabilities corresponding to each piece of the product information of each of the object detectors, and (iii) determining the order of degrees of each set of the detection reliabilities of each of the object detectors by referring to a preset second reliability set as a base reliability if no feature information of the object detectors is acquired.

18. The specific merging device of claim 12, wherein, supposing that first total objects corresponding to one of the first object detection information and the (k-2)-th object merging information are designated as A1 to Ai and that second total objects corresponding to one of the second object detection information and the k-th object detection information are designated as B1 to Bj, wherein the first total objects include the primary objects and the secondary objects, and the second total objects include the primary objects and the secondary objects,
at the process of (II), the processor calculates cost of correspondence between said A1 to Ai and said B1 to Bj by the matching operation, and merges said A1 to Ai and said B1 to Bj according to the calculated cost.

19. The specific merging device of claim 18, wherein the processor calculates the cost of correspondence between said A1 to Ai and said B1 to Bj by using either any one of following (i) to (v) or a weighted sum of at least two of said (i) to (v), wherein said (i) represents one minus a first IoU which is an intersection over union of three dimensional cubes between one of said A1 to Ai and one of said B1 to Bj, wherein said (ii) represents one minus a second IoU which is an intersection over union of two dimensional rectangles resulting from projecting three dimensional cubes including one of said A1 to Ai and one of said B1 to Bj on a two dimensional plane from a bird's eye view, wherein said (iii) represents a Euclidean distance between centers of mass of one of said A1 to Ai and one of said B1 to Bj, wherein said (iv) represents an angle between one of said A1 to Ai and one of said B1 to Bj, and wherein said (v) represents a difference of speeds between one of said A1 to Ai and one of said B1 to Bj.

20. The specific merging device of claim 18, wherein the processor adds first undetected objects corresponding to either the first object detection information or the (k-2)-th object merging information by an amount of C1 to Cj such that the first undetected objects correspond to said B1 to Bj, and adds second undetected objects corresponding to either the second object detection information or the k-th object detection information by an amount of D1 to Di such that the second undetected objects correspond to said A1 to Ai, and
    wherein the processor calculates cost of correspondence between (i) said A1 to Ai and said C1 to Cj and (ii) said B1 to Bj and said D1 to Di, by the matching operation, and merges (i) said A1 to Ai and said C1 to Cj and (ii) said B1 to Bj and said D1 to Di.

21. The specific merging device of claim 20, wherein the processor determines (i) cost of correspondence between (i-1) one of said C1 to Cj and (i-2) one of said B1 to Bj and said D1 to Di and (ii) cost of correspondence between (ii-1) one of said D1 to Di and (ii-2) one of said A1 to Ai and said C1 to Cj, as preset initial values.

22. The specific merging device of claim 18, wherein, at the process of (II), the processor, during a process of merging said A1 to Ai and said B1 to Bj according to the calculated cost, (i) merges status information on the first and the second total objects into a weighted sum with weights being the detection reliabilities corresponding to each of the first and the second total objects, and (ii) merges product information of a certain object detector whose sum of the detection reliabilities is a highest to product information on the first and the second total objects.

\* \* \* \* \*